(No Model.)

J. G. CLARKE.
LAND ROLLER.

No. 526,647.

Patented Sept. 25, 1894.

Witnesses
Geo. E. Frech.

Inventor
James G. Clarke

UNITED STATES PATENT OFFICE.

JAMES G. CLARKE, OF MOUNT PLEASANT, MICHIGAN.

LAND-ROLLER.

SPECIFICATION forming part of Letters Patent No. 526,647, dated September 25, 1894.

Application filed May 17, 1894. Serial No. 511,593. (No model.)

*To all whom it may concern:*

Be it known that I, JAMES G. CLARKE, of Mount Pleasant, in the county of Isabella and State of Michigan, have invented certain new and useful Improvements in Land-Rollers; and I do hereby declare the following to be a full, clear, and exact description of the invention, such as will enable others skilled in the art to which it pertains to make and use it, reference being had to the accompanying drawings, which form part of this specification.

My invention relates to an improvement in land rollers; and the object of the same is to construct an improved roller which will effectually adjust itself to the work in hand by responding to the irregularities of the ground in such a way as to at once crush the clods and even the surface.

A further object of my invention is to provide an improved device for securing the roller sections together.

With these objects in view my invention consists in the novel features of construction and in the combination and arrangement of parts which will be fully described hereinafter and especially designated in the claim.

Figure 1:
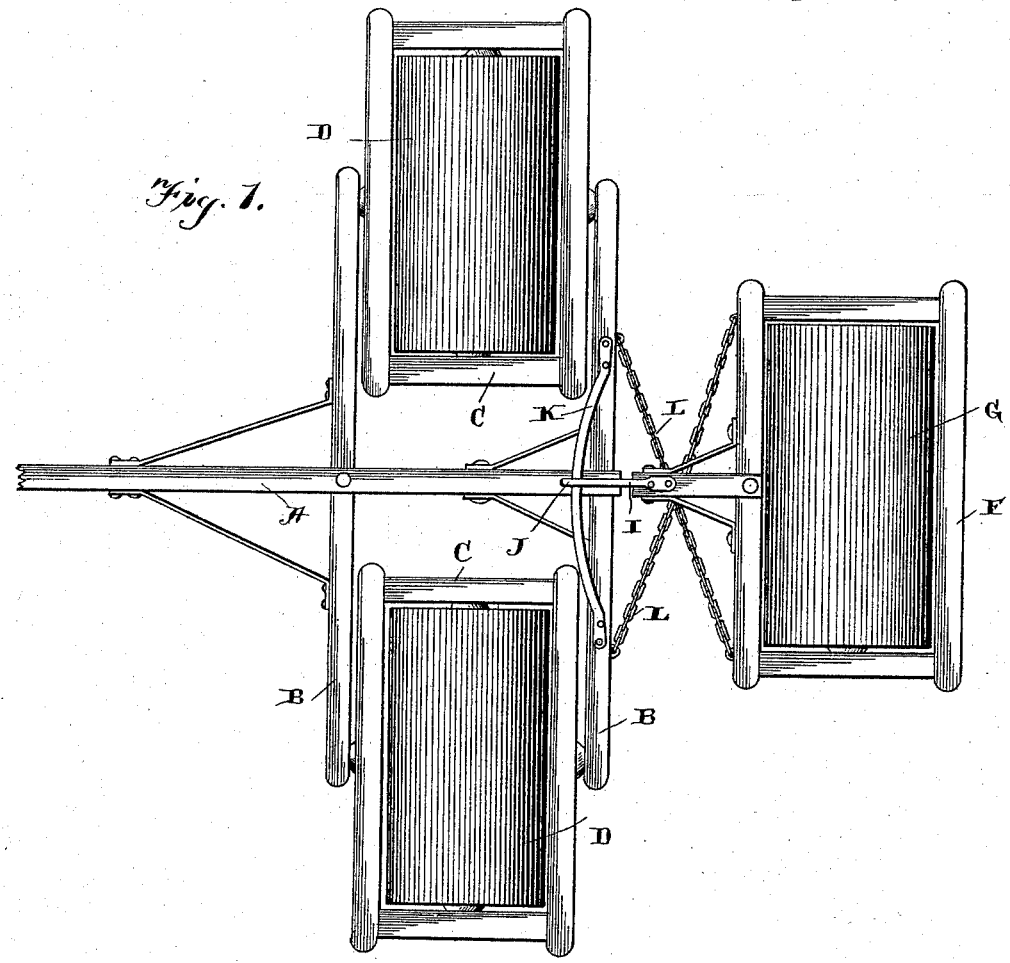
Figure 2:
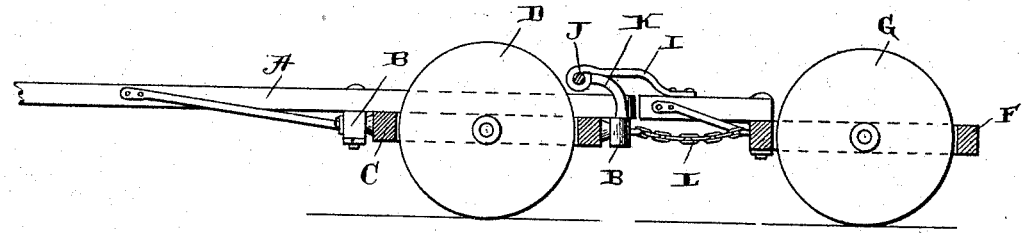

Referring to the accompanying drawings,— Figure 1 is a plan view of the roller. Fig. 2 is an end view partly in section.

A designates the tongue of the implement and suitably secured to the rear portion thereof are the parallel cross beams B which are arranged centrally with relation to said tongue, and pivotally secured between the ends of said beams are the frames C in which the rollers D are journaled. The frames C being pivoted the rollers will adjust themselves to the contour of the ground and thus enable the rollers to traverse the whole surface thereof. The adjacent ends of the said rollers are necessarily somewhat separated and in order to treat the ground left thereby I provide the auxiliary frame F having roller G journaled in the usual manner therein. Extended from frame F is the short tongue H and projected therefrom is the arm I having eye J at its outer end through which is extended the guide rod K secured as shown to the rear beam B. The rod is curved forward slightly to form a circle arc. Connecting frame F and said bar B are the cross chains L arranged as shown.

In operation, when the roller is drawn forward in a straight line the auxiliary roller will follow in the position shown in Fig. 1, while if the roller is turned to either one side or the other the said auxiliary roller will be so guided by the chains as to traverse the ground which has passed between the main rollers unoperated upon. The arm I moving on rod K sustains the major portion of the draft while the chains serve to adjust the same thereon automatically.

Having thus fully described my invention, what I claim as new, and desire to secure by Letters Patent, is—

The combination of a main roller frame and rollers, an auxiliary frame and roller, cross chains connecting the frames, an arm extended forward from the auxiliary frame and having an eye in its outer end, and a guide rod on the main frame, which extends through the eye of the arm and on which the latter moves, substantially as shown and described.

In testimony whereof I affix my signature in presence of two witnesses.

JAMES G. CLARKE.

Witnesses:
 FRED BELLINGER,
 J. A. LIVINGSTON.